United States Patent [19]

Harada et al.

[11] Patent Number: 4,966,649

[45] Date of Patent: Oct. 30, 1990

[54] PROCESS FOR MANUFACTURING A VIBRATING TYPE TRANSDUCER

[75] Inventors: Kinji Harada; Kyoichi Ikeda; Hideki Kuwayama; Takashi Kobayashi; Tadashi Nishikawa; Tetsuya Watanabe; Takashi Yoshida, all of Tokyo, Japan

[73] Assignee: Yokogawa Electric Corporation, Tokyo, Japan

[21] Appl. No.: 424,510

[22] Filed: Oct. 20, 1989

Related U.S. Application Data

[62] Division of Ser. No. 245,681, Sep. 16, 1988, Pat. No. 4,926,143.

[30] Foreign Application Priority Data

May 27, 1988 [JP] Japan ................... 63-129671

[51] Int. Cl.$^5$ ............... H01L 21/306; B44C 1/22; C03C 15/00; C03C 25/06
[52] U.S. Cl. .................. 156/647; 29/621.1; 156/628; 156/653; 156/657; 156/659.1; 156/662
[58] Field of Search ............ 156/628, 647, 648, 649, 156/653, 657, 659.1, 661.1, 662; 29/25.35, 621.1; 338/2, 4; 357/26; 331/154; 73/517 AV, 715, 720; 437/9, 67, 78, 228

[56] References Cited

U.S. PATENT DOCUMENTS

| | | | |
|---|---|---|---|
| 4,783,237 | 11/1988 | Aine et al. | 156/647 X |
| 4,849,071 | 7/1989 | Evans | 29/621.1 X |
| 4,895,616 | 1/1990 | Higashi et al. | 156/647 |

OTHER PUBLICATIONS

Petersen, "Micromechanical Voltage Controlled Switches and Circuits", 1978 International Electron Devices Meeting, 4–6 Dec. 1978.

Primary Examiner—William A. Powell
Attorney, Agent, or Firm—Moonray Kojima

[57] ABSTRACT

A vibrating type transducer wherein an H-shaped vibrator, formed integrally with a silicon substrate and having a hollow chamber provided therearound, is kept self oscillating at its natural resonance frequency together with an amplifier. A physical quantity, such as force, pressure, differential pressure, or the like, which is applied to the silicon substrate is detected by a change in the natural frequency arising at the vibrator corresponding to the physical quantity. The invention also includes a method for manufacturing such transducer using a semiconductor technique, including steps for keeping a vacuum internally in the hollow chamber, imparting an initial tension to the vibrator, and then operating the amplifier to have stable self oscillation.

16 Claims, 15 Drawing Sheets

| Impurity | Covalent Bond Radius Ri(Å) | Ri/Rsi |
|---|---|---|
| P | 1.10 | 0.940 |
| As | 1.18 | 1.001 |
| Sb | 1.36 | 1.162 |
| B | 0.88 | 0.752 |
| C | 0.77 | 0.658 |
| Si | 1.17 | 1 |
| Ge | 1.22 | 1.043 |
| Sn | 1.40 | 1.197 |

PROCESS FOR MANUFACTURING A VIBRATING TYPE TRANSDUCER

This is a division of application Ser. No. 245,681 filed Sep. 16, 1988, U.S. Pat. No. 4,926,143.

BACKGROUND OF THE INVENTION

1. Field of Invention

This invention relates to a vibrating type transducer and manufacturing process thereof; and more particularly, to a vibrating type transducer which is capable of generating stable self-oscillation and has high S/N ratio, and to a process for manufacturing such transducer.

2. Description of Prior Art

FIGS. 1, 2, 3 and 4 are block diagrams depicting one example of the prior art vibrating type transducer, wherein FIG. 1 is a perspective view of the transducer which is used as a pressure sensor, FIG. 2 is a block diagram wherein section A of FIG. 1 is enlarged and a vibration detection circuit is connected thereto, FIG. 3 is a sectional view taken along line A—A of FIG. 2, and FIG. 4 is an explanatory drawing showing an electrical equivalent circuit of the device of FIG. 2.

FIG. 1 depicts a silicon single crystal substrate 10 having a (100) plane on the top thereof, which is $10^{15}$ atoms/cm$^3$ or below, for example, in impurity concentration and of p-type conduction. A diaphragm 11 is formed from the back, through etching, as a thin layer on one side of substrate 10, as depicted.

A peripheral thick wall part 10 of diaphragm 11 is joined to a pedestal 14 having a pressure hole 13 at the center. Pedestal 14 has a pressure pipe 15 joined thereto so as to communicate with pressure hole 13. A pressure P (see arrow) to be measured, is introduced to pressure pipe 15.

An n+ diffusion layer (not indicated) having $10^{17}$ impurity concentration is formed partly on a surface of the side of diaphragm 11 indicated by reference letter A which is not etched. As shown in FIG. 2, a vibrator 16 is formed on a part of the n+ diffusion layer in the direction of <001>. Vibrator 16 is obtained, for example, by processing the n+ layer and the p-layer formed on diaphragm 11 using photolithography and underetching.

A magnet 17 is provided over vibrator 16 almost at the center thereof orthogonally to vibrator 16 and also positioned to not be in contact therewith. As shown in FIG. 3 and SiO$_2$ film 18, used as an insulating film, is provided on layer 11, as depicted.

Metallic electrodes 19a, 19b (see FIG. 2), such as, for example, A1 and the like, are depicted with one end of electrode 19a being connected to the n+ layer extending from vibrator 16, through a contact hole 20a provided by way of SiO$_2$ layer, and with the other end of electrode 19a being connected through a lead wire (unnumbered) to a comparison resistance R$_o$, almost equal to the resistance value of vibrator 16, and also to an input end of amplifier 21. An output signal is generated from an output end of amplifier 21, which is connected to one end of primary coil L$_1$ of transformer 22. Another end of coil L$_1$ is connected to common.

The other end of comparison resistance R$_o$ is connected to one end of a secondary coil L$_2$ of transformer 22 with the midpoint thereof being connected to common, and the other end of secondary coil L$_2$ being connected to the n+ layer through metallic electrode 19b and a contact hole 20b formed likewise on another end of vibrator 16.

In the above device, when a reverse bias voltage is applied to the insulation between the p-type layer (i.e substrate 10) and the n+ layer (i.e vibrator 16), and an alternating current is carried to vibrator 16, an impedance of vibrator 16 rises in a resonance state of vibrator 16. If the impedance is R, the equivalent circuit of FIG. 4, is obtained.

Secondary coil L$_2$ having a center point C$_o$ connected to common, comparison resistance R$_o$, and impedance R$_o$ together constitute a bridge. Thus, if an unbalanced signal, due to the bridge, is detected on amplifier 21 and the output is fed back positively to primary coil L$_1$ through feedback line 23, the system will generate a self-oscillation at a natural vibration frequency of vibrator 16.

The impedance R of vibrator 16 rises at the natural vibration frequency and may be expressed by the following:

$$R \approx (1/222) \cdot (1/(E g \gamma)^{\frac{1}{2}}) \cdot (AB^2 l^2/bh^2) \cdot Q + Rd \ldots (1)$$

wherein E is the modulus of elasticity, g is gravity acceleration, $\gamma$ is the density of the vibrator material, A is the constant determined by vibration mode, B is the magnetic flux density, l is the length of vibration beam, b is the width of vibration beam, h is the thickness of the vibrator beam, Q is the quality factor, and Rd is the DC resistance value.

According to equation (1), since Q of vibrator 16 takes values of several hundreds to several tens of thousands, a large amplitude signal is obtainable as an output of amplifier 21 in the resonance state. Thus, by making the gain of amplifier 21 sufficiently large and by providing positive feedback, the system of the vibrating type transducer is self excited to vibration at the natural vibration frequency.

A p-type device obtained from diffusing, for example B (boron), on an n-type silicon substrate at $4 \times 10^{19}$ atoms/cm$^3$ or more, through selective etching may be used as a vibrator.

However, in such vibrating type transducer, a counter electromotive force generated on vibrator 16 is detected from an unbalanced voltage of the AC bridge. Since the component of an excited current cannot thoroughly be suppressed by the DC bridge, a voltage according to the excited current component is multiplied by the bridge output. Thus, the S/N ratio of the output is deteriorated by change in impedance of the vibrator being superposed on voltage of the excited component. Hence, stable output signal is not obtainable.

SUMMARY OF THE INVENTION

Accordingly, an object of the invention is to overcome the aforementioned and other deficiencies and disadvantages of the prior art.

Another object is to provide a vibrating type transducer having a vibrator which has a satisfactory S/N (signal to noise) ratio, has a stable output, and has high sensitivity, and to provide a process for manufacturing such transducer.

The foregoing and other objects and features are attained by the invention which encompasses a vibrating type transducer comprising a vibrator body comprising a silicon single crystal material which is provided on a silicon single crystal substrate; an excitation means for exciting the vibratory body; a vibration detection means for detecting vibration of the excited vibrator body; an H-shaped vibrator body having two first vibrators with both ends fixed on a substrate, which are disposed in parallel with each other and second vibrator for coupling mechanically center portions of the first vibrators; a magnetic field impression means for impressing a DC magnetic field orthogonally to the vibrator body; an excitation means for vibrating the vibrators by mutual action with the DC magnetic field by flowing an alternating current to opposite ends of the one first vibrator or to the one same end of the two first vibrators; a vibration detection means for detecting an electromotive force generated on opposite ends of the other first vibrator or on the other same end of the two first vibrators; and an amplification means connected between the excitation means and vibration detection means.

The vibrator is provided with a predetermined initial tension by implanting another atom having a coupling radius which is smaller than the coupling radius of an atom constituting the vibrator.

The process for manufacturing the vibrating type transducer comprises forming a beam like vibrator integrally on a thin diaphragm formed on a silicon single crystal substrate through a predetermined gap with the diaphragm except the end portion; covering the top thereof with a shell through a predetermined gap with the vibrator; forming a part corresponding to the gap and a vibrator consisting of silicon or silicon dioxide integrally with a substrate; covering an upper portion of the gap corresponding part with a shell equivalent part integrally with the substrate; forming an etching reagent injection port reaching the gap corresponding part on the shell equivalent part to remove the gap corresponding part through etching; and then closing the injection port to maintain air tightness.

In the invention, if a physical quantity, such as an external force, is applied to the diaphragm on the substrate, a natural vibration frequency of the vibrator body changes according to then applied external force. A vibration of the vibrator body is detected by the vibration detection means and a change in the natural frequency is extracted as an output signal Then, the physical quantity applied to the diaphragm is detected from the change in natural frequency.

Furthermore, in the manufacturing process, the thin diaphragm is formed on the silicon substrate through an etching process, and the H-shaped vibrator body can be formed on this portion integrally with the diaphragm by use of an etching process and use of semiconductor techniques according to the characteristics of the single crystal.

BRIEF DESCRIPTION OF THE DRAWINGS

FIGS. 6(a) and 6(b) main parts of the vibrator body of FIG. 5, wherein FIG. 6(a) is a top view with the shell removed, and FIG. 6(b) is a sectional view taken along B—B of FIG. 6(a).

DETAILED DESCRIPTION OF PREFERRED EMBODIMENTS

Figure 1:
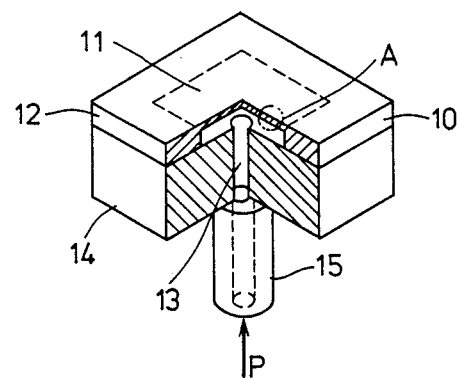
FIG. 1 is a perspective view depicting a prior art vibrating type transducer used as a pressure sensor.
Figure 2:
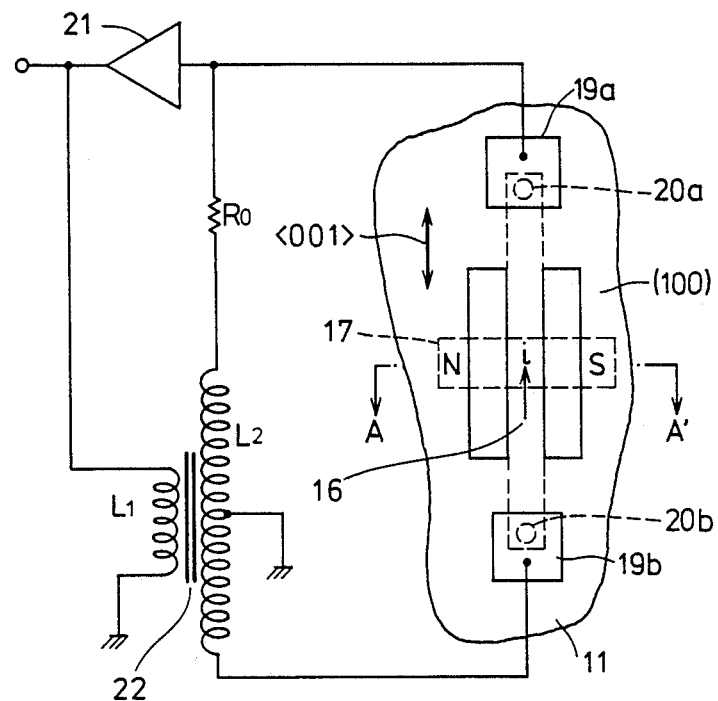
FIG. 2 is a block diagram depicting an enlargement of section A of FIG. 1 and a vibration detection circuit connected thereto.
Figure 3:
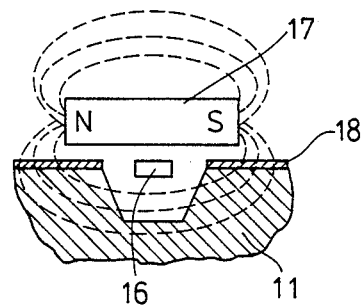
FIG. 3 is a sectional view taken along line A—A in FIG. 2.
Figure 5:
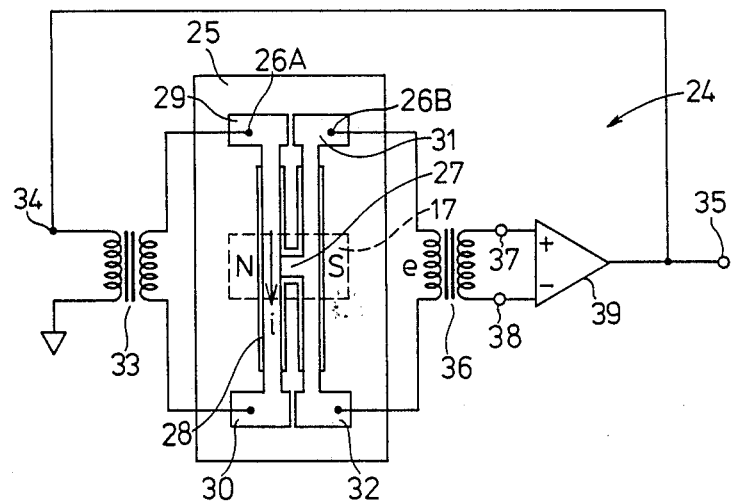
FIG. 5 is a general block diagram depicting an illustrative embodiment of the invention.
Figure 6A:
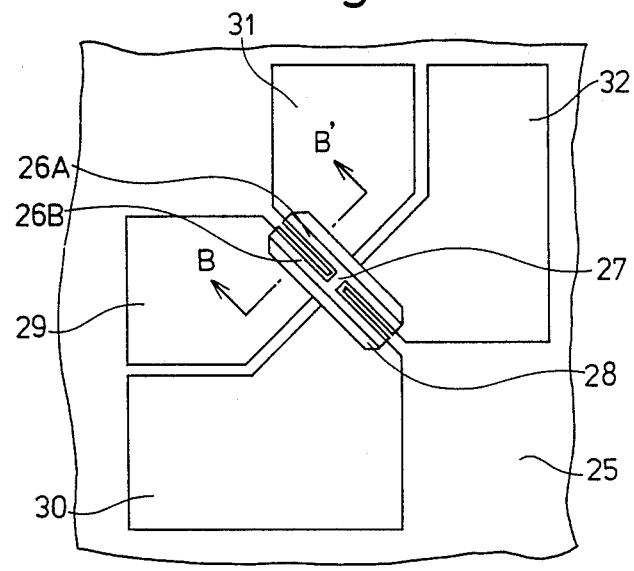
Figure 6B:
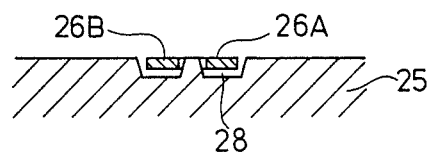

FIGS. 5, 6(a) and 6(b) depict a vibrator body 24 comprising an H-shaped vibrator comprising first vibrators 26A, 26B and second vibrator 27 of p-type material, such as silicon, which are formed integrally on a diaphragm 25 made of a silicon single crystal of n-type. As in the case of the diaphragm 11 shown in FIG. 3, diaphragm 25 is formed by etching and thinning the central portion of a lower surface of the n-type silicon substrate having a thick wall part (not indicated) therearound, and is displaced as a whole from having a measuring pressure applied thereon. An H-shaped recess 28, in which first and second vibrators are contained, is formed through an etching process on a part of crystal face (100) on an upper surface of diaphragm 25.

Beamlike first vibrators 26A, 26B are formed of p-type material integrally with diaphragm 25 in parallel with a crystal axis <001> each disposed over recess 28 (see FIG. 6(b)). These central portions are coupled by p-type beamlike second vibrator 27 rectangularly to these vibrators, thereby forming an H shaped vibrator, as depicted.

Electrodes 29 and 30 are formed on opposite ends of first vibrator 26A, and electrodes 31 and 32 are formed on opposite ends of first vibrator 26B.

A magnet 17 is disposed on an upper portion of second vibrator 27 in parallel therewith, thus generating a magnetic field rectangularly on first vibrators 26A, 26B.

An output terminal of an input transformer 33, functioning as an excitation means, is connected to electrodes 29, 30. One end of input terminal 34 is connected to an output terminal 35 and the other end is connected to common.

An input terminal of an output transformer 36, functioning as a vibration detection means, is connected to electrodes 31, 32 and output terminals 37, 38 are connected to input ends of amplifier 39. The output of amplifier 39 is connected to terminal 35 and fed back to terminal 34.

The shell covering an upper part of the diaphragm 25 is excluded for sake of convenience of description. However, as will be described hereinafter, first vibrators 26A, 26B and second vibrator 27 are practically covered therearound integrally with the diaphragm 25 through a predetermined gap using a semiconductor technique such as epitaxial growth or the like. Moreover, the gap is kept in a vacuum internally to maintain a high Q factor to vibration of the vibrators.

In the above embodiment, first vibrator 26A is excited to vibrate by a voltage inputted to input transformer 33 from amplifier 39 according to mutual action with the magnetic field of magnet 17. The vibration then vibrates first vibrator 26B through second vibrator 27, and the vibration drives the output transformer 36 to generate an electromotive force e on the input end through mutual action with magnet 17. Electromotive force e is inputted to amplifier 39 through output transformer 36, then amplified, and then extracted at output terminal 35. The amplified voltage is fed back positively to the input transformer 33, which is repeated then to self oscillation of the system.

As described above, vibrator body 24 is divided into first vibrator 26A for excitation and first vibrator 26B for electromotive force, and first vibrators 26A and 26B are coupled together mechanically at loops of vibration by second vibrator 27. Thus, the excited current component is not superposed on the electromotive force e, and a high excited component removing ratio (i.e. the S/N ratio) is obtained.

Figure 7:
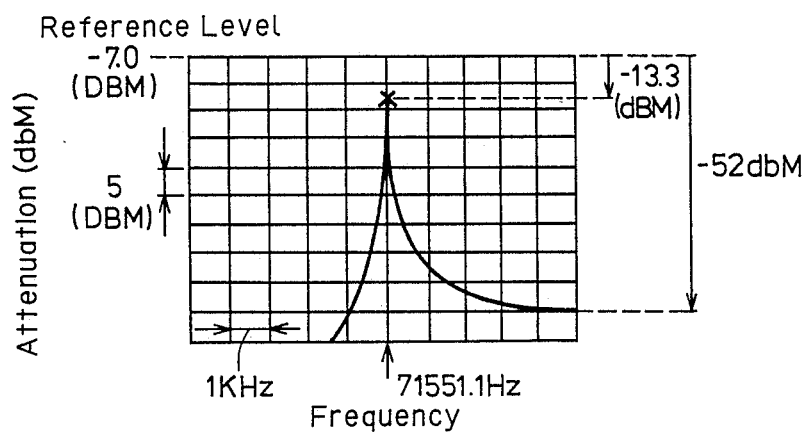
FIG. 7 is a graph depicting S/N ratio characteristics of the transducer of FIG. 5.

In FIG. 7, the abscissa indicates a frequency of 1 KHz per graduation, and the ordinate indicates an attenuation of 5 dB per graduation. The resonance frequency, when no pressure is applied to diaphragm 25, is 71.551.1 Hz. The point indicated by a mark x is −13.3 dBm with a reference level as −7.0 dBm, coming gradually near to the line indicating a −52 dBm noise line accordingly as it comes off the resonance point. The S/N ratio is represented as a difference of these figures. Thus, the S/N ratio coming in at 30 to 40 dB is far better than ever previously obtained.

Figure 8:
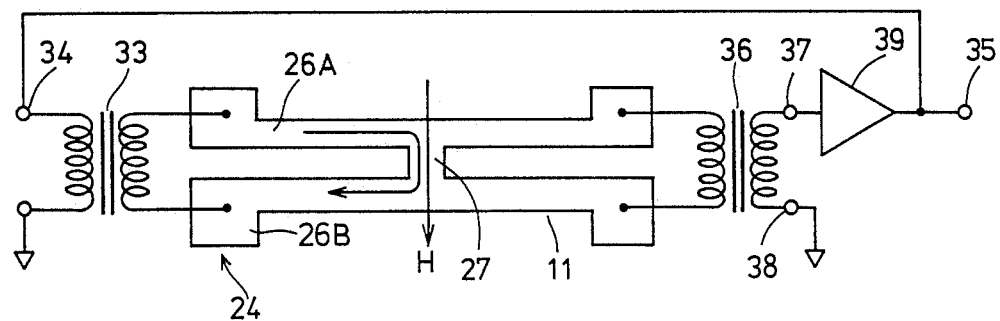
FIG. 8 is a block diagram depicting another illustrative embodiment of the invention.

In FIG. 8, a secondary side of input transformer 33 is connected to the same ends of first vibrators 26A, 26B and the primary side of output transformer 36 is connected to the opposite ends of first vibrators 26A, 26B.

In the above embodiment, second vibrator 27 is of a p-type silicon. However, it is not necessarily limited thereto, and may be, for example, a conductor, such as aluminum or the like evaporated on silicon oxide ($SiO_2$) or silicon nitride ($Si_3N_4$).

Furthermore, such vibrating type transducers change their vibrating frequency according to the temperature coefficient of the elastic modulus of silicon Thus, these can be utilized as a thermometer, when contained in a vacuum vessel, and also as a densimeter other than pressure gauge.

As described, vibrator body 24 is divided into first vibrator 26A for excitation and first vibrator 26B for detecting the electromotive force, and furthermore, the first vibrators 26A, 26B are coupled together mechanically by second vibrator 27 at the loops of vibrations. Thus, an excited current component is not included, and a high excited component removing ratio (i.e. S/N ratio) is obtained.

Consequently, according to the embodiment of FIG. 8, a vibrating type transducer satisfactory in S/N ratio and stable in output signal frequency is obtained by the invention.

FIGS. 9(a)–9(f), for simplicity of description, refer to manufacturing beam like first vibrator 26A without vibrators 26B and 27.

Figure 9:
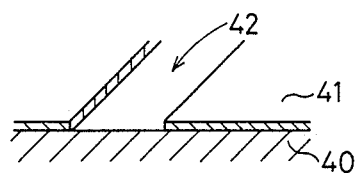
FIGS. 9(a)-9(f) are drawings depicting the process for manufacturing the embodiment of FIG. 5.
Figure 9:
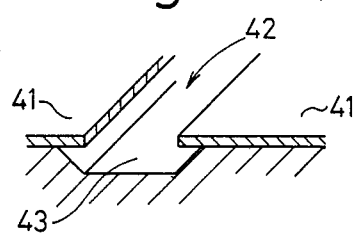
Figure 9:
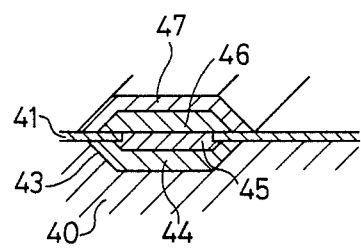
Figure 9:
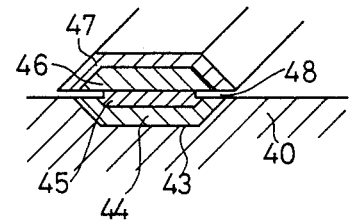
Figure 9:
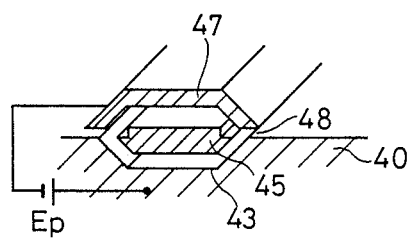
Figure 9:
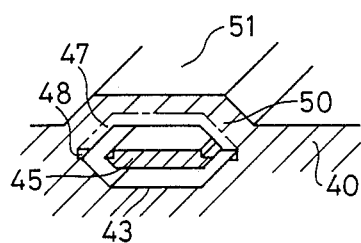

FIG. 9(a) shows a process for forming a protective coat and opening one part thereof, wherein a protective coat 41, such as silicon oxide, silicon nitride or the like, is formed on a crystal face (100) of an n-type silicon single crystal substrate 40. Then, an opening 42 is formed on a part of protective coat 41 by means of a mask with a pattern in the shape of the first vibrator 26A formed thereon.

The process then proceeds to FIG. 9(b) wherein a recess is formed in the substrate Recess 43 is formed in substrate 40 corresponding to opening 42 by etching in hydrogen chloride in an atmosphere of 1,050° C. hydrogen ($H_2$). In this case, an anisotropic etching may be used by means of an alkali solution at 40° C. to 130° C. , for example, instead of hydrogen chloride.

FIG. 9(c) shows an epitaxial growth process wherein hydrogen chloride is mixed in a source gas in an atmosphere of 1,050° C. hydrogen to form a multilayer selective epitaxial growth. In this respect:

1. For the first step, a first epitaxial layer 44, functioning as a lower half of the gap corresponding part, is subjected to selective epitaxial growth on recess 43 by means of p-type silicon having an impurity concentration of $10^{18}$ cm$^{-3}$ boron.

2. For the second step, a second epitaxial layer 45 corresponding to the first vibrator 26A is subjected to selective epitaxial growth on a surface of the first epitaxial layer 44 so as to close the opening 42 by means of p-type silicon having impurity concentration of $10^{20}$ cm$^{-3}$ boron.

3. For the third step, a third epitaxial layer 46, functioning as an upper half of the gap corresponding part, is subjected to selective epitaxial growth on a surface of second epitaxial layer 45 by means of p-type silicon having an impurity concentration of $10^{18}$ cm$^{-3}$ boron.

4. For the fourth step, a fourth epitaxial layer 47, corresponding to the shell, which will be described hereinafter, is subjected to selective epitaxial growth on a surface of third epitaxial layer 46, by means of p-type silicon having an impurity concentration of $10^{20}$ cm$^{-3}$ boron. In this case, n-type silicon having an impurity concentration of $10^{17}$ cm$^{-3}$ phosphorus may also be used for the third epitaxial layer 46.

FIG. 9(d) shows a process for the forming of an injection port through which an etching reagent is injected, wherein protective coat 41 is etched and removed by means of hydrofluoric acid (HF), and an injection port 48, through which an etching reagent is injected, is provided on a side of the fourth epitaxial layer 47.

FIG. 9(e) shows a selective etching process for forming a clearance between the vibrator and the substrate and other elements, wherein a positive pulse voltage is applied, from a pulse supply $E_p$, so that n-type substrate 40 will be reverse biased to p-type fourth epitaxial layer 47. An alkali solution is injected through injection port 48 to protect substrate 40. Thus, first epitaxial layer 44 and third epitaxial layer 46 are removed through selective etching. In this case, n-type silicon having an impurity concentration of $10^{17}$ cm$^{-3}$ phosphorus may be used for the third epitaxial layer 46, and p-type silicon having an impurity concentration of $10^{20}$ cm$^{-3}$ boron may be used for the fourth epitaxial layer 47. The phenomenon, that etching action is suppressed when boron concentration exceeds $4 \times 10^{19}$ cm$^{-3}$, is utilized therefor.

FIG. 9(f) shows the process for sealing, wherein n-type silicon is subjected to an epitaxial growth in an atmosphere of hydrogen at 1,050° C., and an epitaxial layer 50 is formed on the outer surfaces of substrate 40 and fourth epitaxial layer 47, to construct a shell 51 partly, and to close injection port 48 thereby to effect sealing. The sealing process may also comprise (1) closing the injection port 48 by heat oxidation, (2) closing the injection port 48 by filming the injection port 48 with polysilicon according to the CVD process or by sputtering, (3) filling up silicon in the injection port 48 according to vacuum evaporation of the epitaxial process, or (4) filling up an insulating material, such as, for example, glass ($SiO_2$), silicon nitride, alumina, or the like, in the injection port 48 according the the CVD process, by sputtering, or by evaporation.

While not so indicated, diaphragm 25 may be formed thereafter by reducing the thickness of the substrate through etching from a bottom side of substrate 40.

Advantageously, the foregoing process realizes the following effects. Since substrate 40, second epitaxial layer 45, functioning as first vibrator 26A and shell 51 are formed integrally, it is not necessary to bond substrate 40 and shell 51 together, thus avoiding instability which results from bonding. Moreover, the air and the vibrators can be isolated by a simple structure, miniaturization can be easily carried out. Furthermore, since semiconductor techniques are used, accurate positioning, thicknesses and shapes of the vibrators and shell are obtained.

Figure 10A:
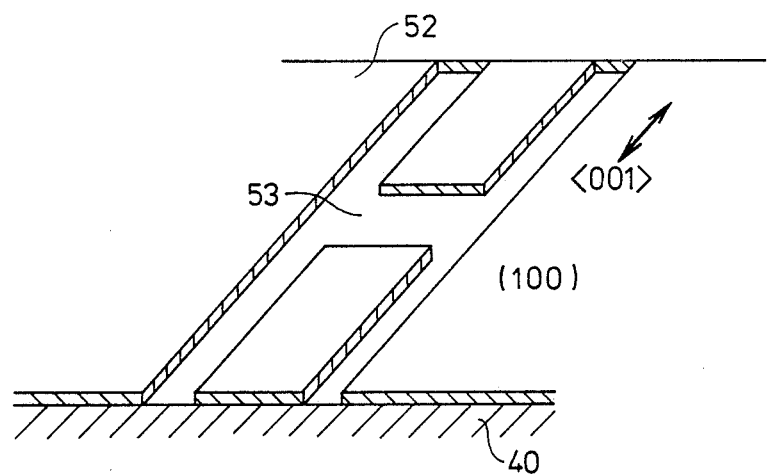
FIGS. 10(a) and 10(b) are drawings depicting a part of the process for forming the H-shaped vibrator body of FIG. 5.
Figure 10B:
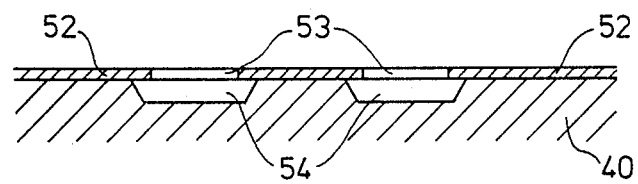

FIGS. 10(a) and 10(b) show a part of the process for forming the H-shaped vibrator body, wherein the process shown in FIGS. 10(a) and 10(b) may be substituted for those steps shown in FIGS. 9(a) and 9(b) to realize H-shaped vibrator body 24. First, as shown in FIG. 10(a), a protective coat 52, such as silicon oxide, silicon nitride, or the like, is formed on an upper surface of crystal plane (100) of silicon substrate 40. Then, protective coat 52, formed on a surface of substrate 40, is removed to form an H-shape through use of photolithography with a mask having an H-shaped opening, thus forming an H-shaped opening 53 on protective coating 52. The H-shaped opening 53 is disposed so that H-shaped beams formed by each first vibrators 26A, 26B and second vibrator 27 face in the direction <001> of substrate 40 and also in the direction orthogonal thereto.

Next, as shown in FIG. 10(b), an H-shaped recess 54, corresponding to opening 53, is formed on substrate 40 by etching protective coat 52 having opening 53. Then, H-shaped vibrator body 24 shown in FIG. 5 is formed according to the process of FIGS. 9(c) 9(f).

Figure 11A:
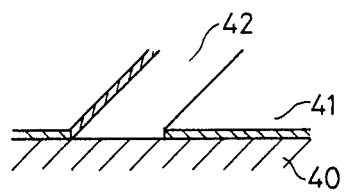
FIGS. 11(a)-11(f) are drawings depicting a process for enhancing and stabilizing the yield of the vibrator in the process shown in FIGS. 9(a)-9(f).
Figure 11B:
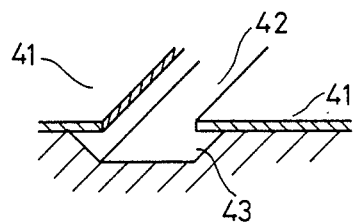
Figure 11C:
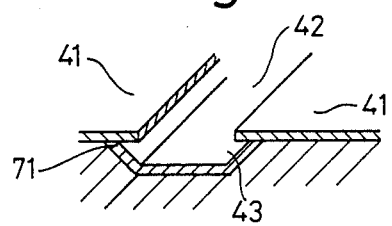

FIGS. 11(a)–11(f) show a process for enhancing and stabilizing the yield of vibrators in the manufacturing process shown in FIGS. 9(a)–9(f), wherein the process is almost the same as the process shown in FIGS. 9(a)–9(f) excepting for the step of FIG. 11(c). The process of FIG. 11(c) comprises forming an epitaxial layer of $p^{++}$ p-type material having a boron impurity of high concentration, which layer material 71 has a thin thickness of 1 μm or below, on a surface of recess 43 formed as shown in FIG. 11(b). In this case, the impurity concentration is set preferably to the limit of etching the p-type epitaxial layer 71 with etching reagent, or, for example, at $3 \times 10^{19}$ cm$^{-3}$ or so.

Figure 11D:
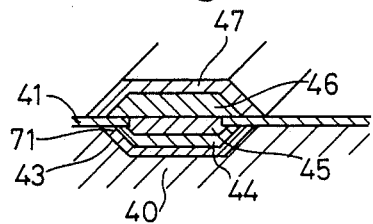
Figure 11E:
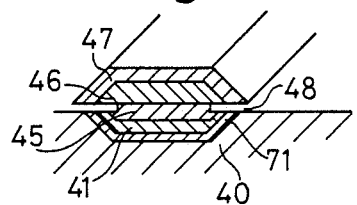
Figure 11F:
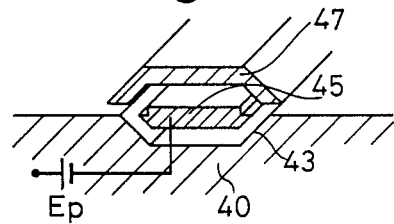

The process then shifts to that for etching of FIG. 11(b) through epitaxial process of FIG. 11(d) and that for forming an etching reagent injection port of FIG. 11(e), wherein an etching reagent is injected from injection port 48 to etch and remove first epitaxial layer 44 equivalent to the gap corresponding part and the third epitaxial layer 46. In this case, auxiliary epitaxial layer 71 is of p-type and is high in impurity concentration inherently. Thus, it is not etched. However, since it is very thin, the boron impurity concentration deteriorates and is ready for etching by an alkali solution according to autodoping using a selective epitaxial process and diffusion at a heating process. Thus, an n-type face of substrate 40 comes out on the surface.

Figure 12:
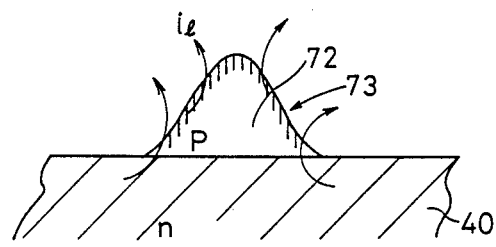
FIG. 12 is a drawing depicting an improvement of the process of FIGS. 9(a)-9(f).
Figure 13:
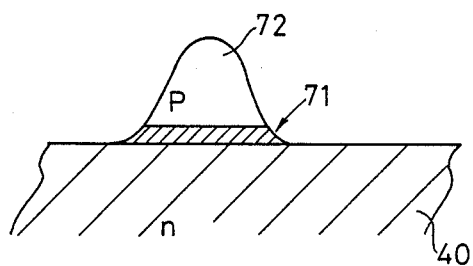
FIG. 13 is a drawing for illustrating the effect of the auxiliary epitaxial layer obtained in FIGS. 11(a)-11(f).

The foregoing process will now be further described with reference to FIG. 12 and FIG. 13. In the process of FIG. 11(c), where there is no auxiliary epitaxial layer 71 present, there remains an island like part of p-type silicon on a pn junction between n-type substrate 40 and p-type first epitaxial layer 44 using the etching process of FIG. 11(f)

A p-type residue 72 (see FIG. 12) which remains as an island like part, forms an n-type inversion layer 73 inverted to n-type at a boundary with the alkali solution which is an etching reagent during etching. Thus, a path, through which a current flows from pulse supply $E_p$ (see FIG. 11(f), as indicated by an arrow, is formed to protect a surface of residue 72 from etching (which may cause the lower portion of the vibrator to be partly not etched. Thus, auxiliary epitaxial layer 71; which is a p-type material having high $p^{++}$ concentration of impurities ($3 \times 10^{19}$ cm$^{-3}$ or so) of boron dope layer having a thin thickness of 1 μm or less, is formed on top of substrate 40. The leakage current il is interrupted to keep residue 72 from being formed and stable etching is attained, thus enhancing productivity.

Figure 14A:
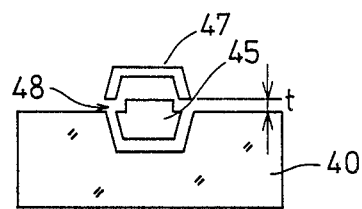
FIGS. 14(a)-14(c) are drawings depicting the main part of the manufacturing process for obtaining a vibratory body which keeps the shell vacuum interiorly.
Figure 14B:
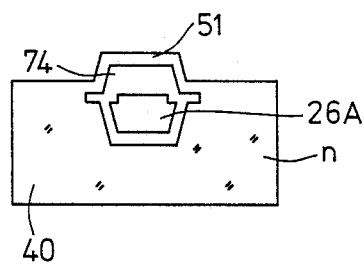
Figure 14C:
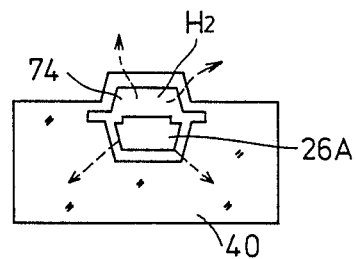

The following process is for forming the shell, as in the case of FIG. 9(f), as described in FIGS. 14(a)–14(c) wherein the process produces a vibrator body which keeps vacuum internally within the shell. For detecting pressure with high sensitivity and with high Q factor, the vibrator should be in a vacuum. In this case, the process forms the beam like vibrators 26A, 26B, 27 integrally with diaphragm 25. FIG. 14(a)–14(c) first vibrators of FIG. 5 as being in vacuum. The process of FIG. 9(a)–9(e) remains the same and the etching result of FIG. 10(a) which is equivalent to FIG. 9(f) is obtained. In the process of FIG. 14(b), the outer surfaces of substrate 40 and fourth epitaxial layer 47, are subjected to an n-type epitaxial growth at a temperature of 1,050° C. generally in an atmosphere of hydrogen or in vacuum. Injection port 48, formed between substrate 40 and fourth epitaxial layer 47, is filled by epitaxial growth, and shell 51 is thus formed. The vibrator body for a vibrating type transducer having, for example, first vibrator 26A, is formed of the second epitaxial layer internally. In this case, an n-type layer equivalent in thickness to a clearance (t) of injection port 48 is formed around first vibrator 26A and also on the inside of a hollow chamber 74.

In the process of FIG. 14(b), since epitaxial growth is effected in an atmosphere of hydrogen, hollow chamber 74, formed between substrate 40 of a silicon single crystal and shell 51, is charged with hydrogen.

As shown in FIG. 14(c), a vibrating type transducer, having the vibrator body, is put into an atmosphere kept at vacuum at a temperature of 900° C. and hydrogen is extracted to vacuum through a crystal lattice of silicon. The degree of vacuum thus obtained is $1 \times 10^{-3}$ Torr or less.

Then, a similar result was obtained in inert gas and nitrogen gas with less hydrogen partial pressure.

Figure 15:
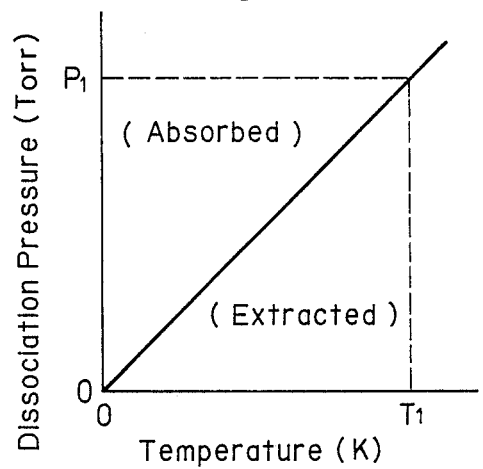
FIG. 15 is a characteristic graph depicting the effect of temperature on dissociation pressure in extracting gas to keep the shell vacuum interiorly in the process of FIGS. 14(a)-14(c).

Next, the hydrogen extraction will be described with reference to FIG. 15, wherein the abscissa indicates temperature, and the ordinate indicates dissociation pressure. The straight line drawn obliquely from the point of origin indicates a boundary separating a domain wherein hydrogen is absorbed in silicon of the substrate 40 and a domain wherein it is extracted externally from silicon. According to the graph, when left as it stands in vacuum/at a temperature of T1 or, for example, 1,200° K. for a long time, hydrogen within shell 51 is absorbed into the silicon of shell 51 and substrate 40 and diffused thereinto, and hydrogen having reached the surface is dissociated and discharged if the pressure is $P_1$, or for example, $10^{-3}$ Torr or less. Thus, hollow chamber 74 may be retained at the degree of vacuum of, for example, $10^{-3}$ Torr internally. The above can be understood from the results obtained from carrying out a test according to the above process wherein a Q factor of $3 \times 10^4$ or more of the first vibrator 26A, which corresponds to about $10^{-3}$ Torr, was obtained using hollow chamber 74 within shell 51.

Figure 16:
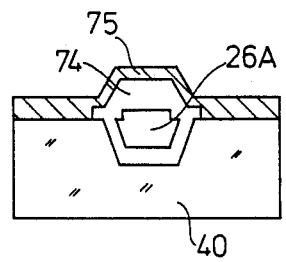
FIGS. 16(a) and 16(b) are drawings depicting a modification of the process shown in FIGS. 14(a)-14(c).
Figure 16:
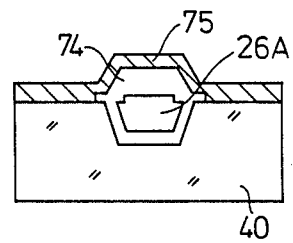

FIGS. 16(a) and 16(b) depict a process which is a modification of the process shown in FIG. 14(a)–14(c), wherein the process up to FIG. 14(a) remains the same, and the process then shifts to that of FIG. 16(a). While injection port 48 is formed through etching in the process of FIG. 14(a), the process 16(a) is used for sealing the injection port 48.

In the process, oxygen is substituted in a gap formed by fourth epitaxial layer 47, working as first vibrator 26A to second epitaxial layer 45, and silicon substrate 40. Then, injection port 48 is sealed through sputtering amorphous silicon, to thereby form shell 75.

Then, the process shifts to FIG. 16(b), wherein the vibrating type transducer, including the vibrating body, is placed in a vacuum at a temperature of 900° C. or more, and an inside wall of hollow chamber 74 is oxidized by oxygen filled in hollow chamber 74 using the process of FIG. 16(a), or oxygen in the silicon is diffused to come out of the silicon surface partly, thereby stepping up the degree of vacuum.

According to the above process, vibrators are formed integrally with the silicon substrate with a predetermined gap left therein, and then, a vacuum is realized through a predetermined process. Thus, a vibrating type transducer which is superior in both pressure and temperature characteristics is realized.

Figures 17, 18:
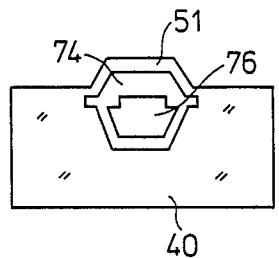
FIG. 17 is a sectional view depicting the main part of a vibrating type transducer wherein an initial tension is applied to the vibrator.
FIG. 18 is a table depicting the relations between a covalent bond radius $R_i$ of each impurity with the ratio of covalent bond radius $R_i$ of various impurities and covalent bond radius $R_{si}$ of silicon.

FIG. 17 depicts a vibrating type transducer wherein an initial tension is applied to the vibrators. The vibrator body is constructed such that the opposite ends are fixed, for example, on n-type silicon substrate 40. The p-type vibrator 13 is fixed with a predetermined gap retained to the substrate 40 and barring the opposite ends, which are covered by silicon shell 51 integrally with substrate 40, and hollow chamber 74 is formed surrounded thereby Hollow chamber 74 retains a vacuum internally.

Then, a measuring pressure $P_m$, for example, is applied to diaphragm 25, and a resonance frequency of vibrator 76, with the opposite ends fixed on diaphragm 25 which corresponds to a strain arising on vibrator 76, is measured, to thereby obtain measuring pressure $P_m$.

Figure 19:
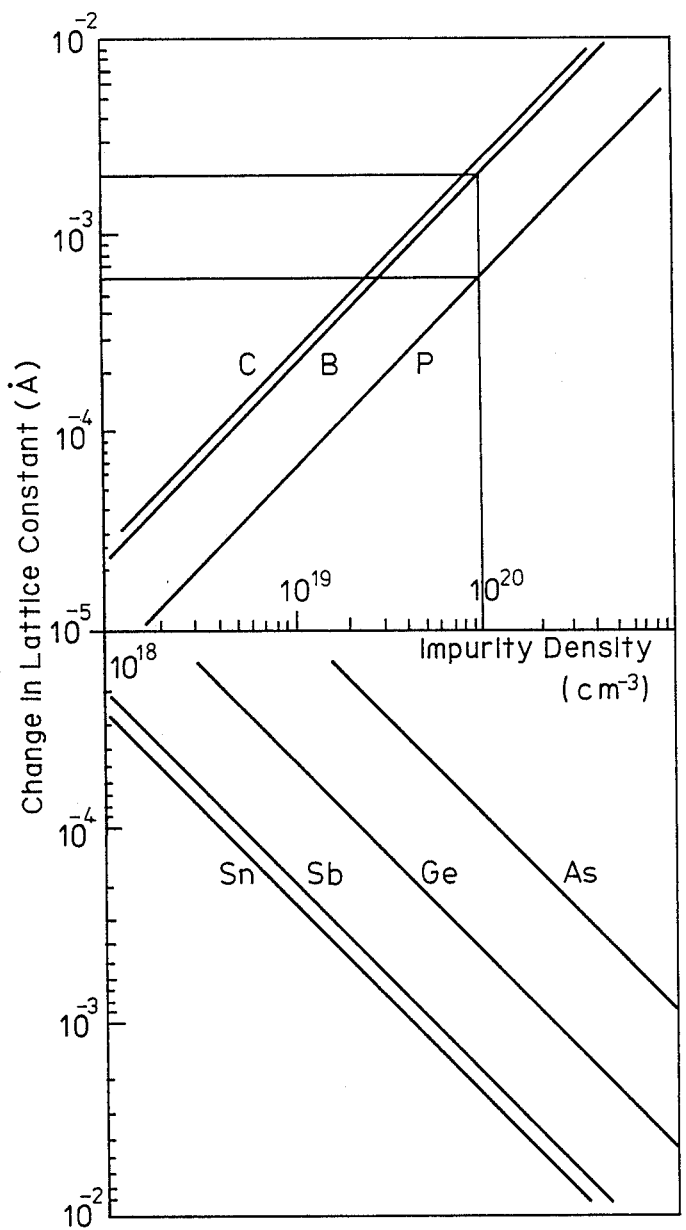
FIG. 19 is a graph depicting relation between change of lattice constant and impurity density.

Meanwhile, unless an initial tension is given even at the time when measuring pressure $P_m$ is zero, buckling will be caused on vibrator 76 by the pressure $P_m$, which is not ready for measurement. Unless dispersion of the initial tension is controlled, dispersion of sensitivity may also result therefrom. FIGS. 18 and 19 will be used to describe this effect.

As will be understood from FIG. 18, while the covalent bond radius $R_{si}$ of silicon is 1.17 Å, that of phosphorus is 1.10 Å and that of boron is 0.88 Å, which are rather small Accordingly, when boron or phosphorus is injected into silicon, the resulting part is subjected to a tensile strain. From FIG. 19, therefore, where impurity concentration of boron is $10^{20}$ cm$^{-3}$, for example, change of the lattice constant is $2 \times 10^{-30}$ Å. Since the lattice constant of silicon is 5.431 Å, the strain is about $4 \times 10^{-4}$ ( equal to $2 \times 10^{-3}/5. 431$). For a strain at $4 \times 10^{-4}$ or more, boron is injected at a double rate or at $2 \times 10^{20}$ cm$^{-3}$. Then, an initial tension at $8 \times 10^{-4}$ is generated in proportion to the injection rate. Accordingly, an arbitrary initial tension may be given from injecting an arbitrary concentration of boron An initial tension is thus given to vibrator 76 shown in FIG. 17.

Figure 21:
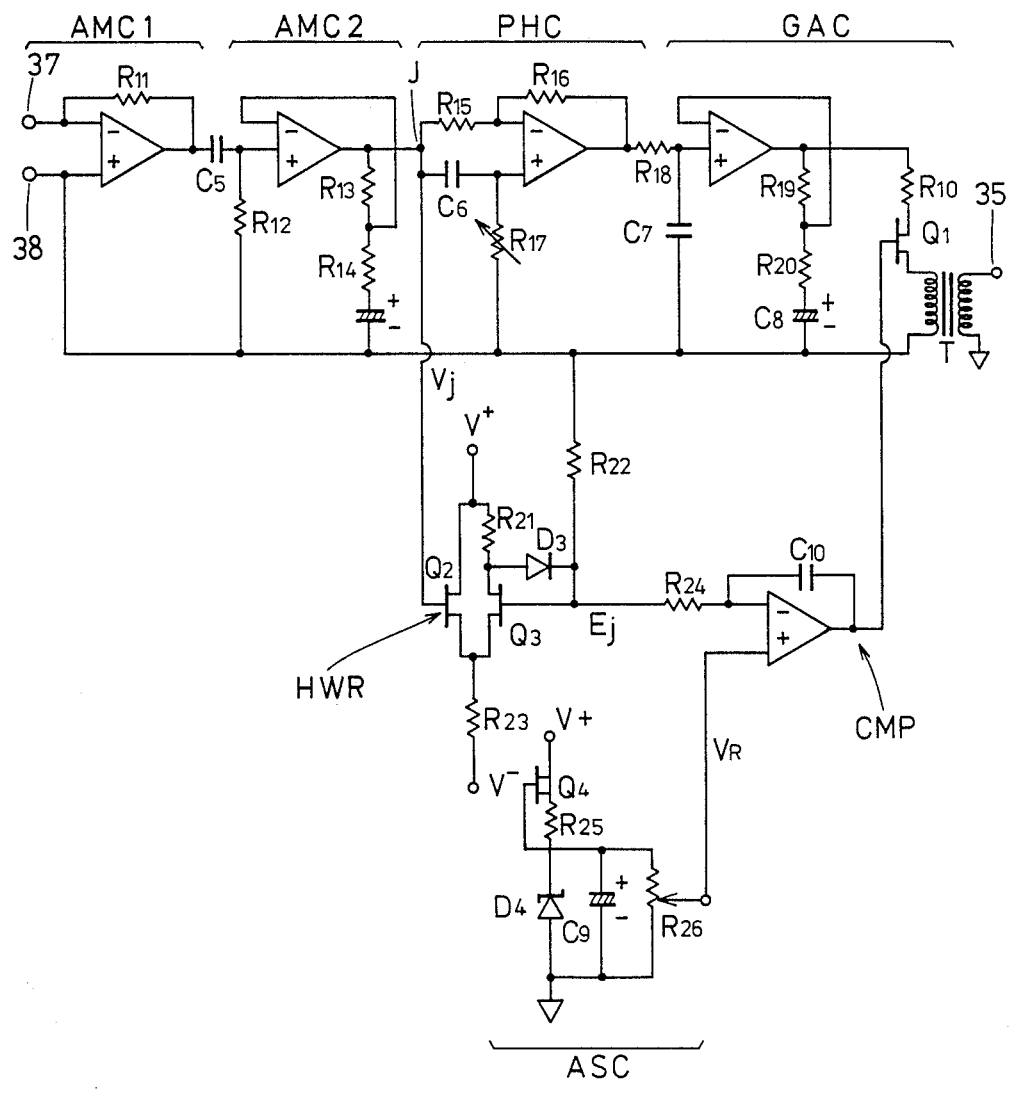
FIG. 21 is a circuit diagram depicting details of the amplifier shown in FIG. 5.

For a strain of less than $4 \times 10^{-4}$, a phosphorus concentration of n-type silicon substrate 40 is increased, or the vibrator 76 is oxidized to segregate boron on the surface of the vibrator into the oxide film, and from removing the oxide film by use of HF, the boron concentration in the vibrator 76 is decreased to adjust the strain at $4 \times 10^{-4}$ or less Then, as will be apparent from FIG. 21, it is presumed that the strain will almost not rise at the boron concentration of $10^{17}$ cm$^{-3}$ or so.

Figure 20A:
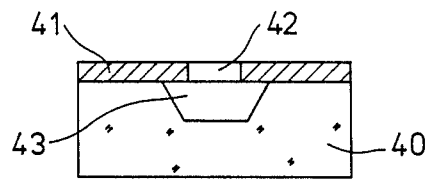
FIGS. 20(a)-20(g) are views depicting a main part of the manufacturing process for the vibrator body which is a main part of the vibrating type strain sensor of FIG. 17.
Figure 20B:
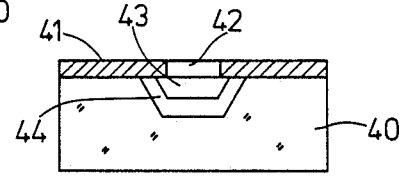
Figure 20C:
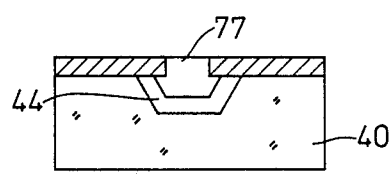

FIG. 20(a) depicts formation of recess 43 through an HCl etching step in the process of FIG. 9(a) and FIG. 9(b). Next, as shown in FIG. 20(b), a $10^{18}$ cm$^{-3}$ concentration of boron (of p-type) is subjected to selective epitaxial growth into recess 43, in an atmosphere of hydrogen, at a temperature of 1,050° C., thereby to form first epitaxial layer 44. Then, as shown in FIG. 20(c), boron (of p-type), adjusted to a concentration of $10^{20}$ cm$^{-3}$ in an atmosphere of hydrogen, at a temperature of 1,050° C., is subjected to selective epitaxial growth on first epitaxial layer 44, to thereby form a second epitaxial layer 77 working as vibrator 76.

The covalent bond radius of silicon is 1.17 Å, and that of boron is 0.88 Å. Thus, when boron is partly injected into silicon, the resulting part is subjected to a tensile strength, which is utilized for imparting the necessary initial tension thereto through adjusting the boron density of the second epitaxial layer 77 working as vibrator 76.

Figure 20D:
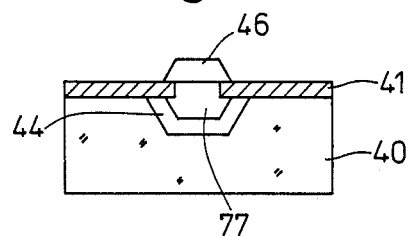

Next, as shown in FIG. 20(d), a $10^{18}$ cm$^{-3}$ impurity concentration of boron of p-type is subjected to selective epitaxial growth on second epitaxial layer 77 in an atmosphere of hydrogen and at 1050° C., to thereby form third epitaxial layer 46. Furthermore, as shown in FIG. 20(e), a $10^{20}$ cm$^{-3}$ concentration of boron of p-type is subjected to selective epitaxial growth on third epitaxial layer 46 in an atmosphere of hydrogen and at a temperature of 1,050° C., to thereby form fourth epitaxial layer 47.

Figure 20E:
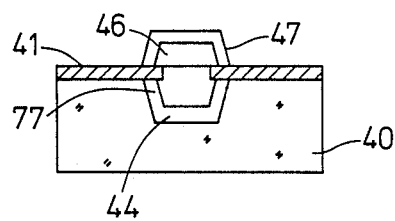
Figure 20F:
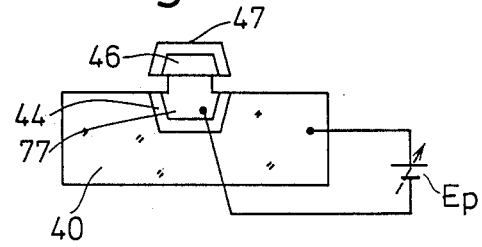

FIG. 20(f) shows an etching process for removing first epitaxial layer 44 and third epitaxial layer 46 in the state wherein SiO$_2$ protective coat 41 has been removed (this step is not shown) through etching by use of hydrogen fluoride (HF) after the process for selective epitaxial growth shown in FIG. 20(e).

Figure 20G:
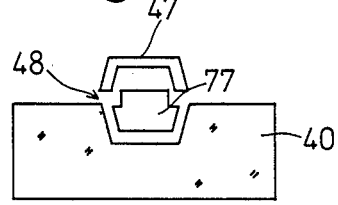

While not illustrated, the whole arrangement may be soaked in an alkali solution in this etching process, and a positive pulse voltage of 5V in peak value and 0.04 Hz, or so, in repetition frequency may be applied from DC pulse supply $E_p$ so that n-type silicon substrate 40 will be a plus potential to p-type second epitaxial layer 77. Since n-type silicon substrate 40 and fourth epitaxial layer 47 have an insoluble film formed on the surface, each to a passive state according to the voltage application, the etching rate becomes considerably low to first epitaxial layer 44 and third epitaxial layer 46, which is utilized for removing layer 44 and layer 46. Furthermore, when the concentration of doped boron is greater than $4 \times 10^{19}$ cm$^{-3}$, the etching rate is considerably reduced from that of the normal case where silicon is not doped. Such a phenomenon is utilized to produce an arrangement wherein injection port 48 is provided partly, and furthermore a gap is secured between substrate 40 and layer 77 as a whole, leaving the second layer 77 as shown in FIG. 20(g).

The following process is the same as that of FIG. 9(g) and FIGS. 14(b)-14(e). The main part of the vibratory body shown in FIG. 17 is formed through such a process. For further adjustment of an initial tension of vibrator 76, a phosphorus impurity concentration in n-type silicon substrate 40, for example, will be adjusted, thereby to adjust the initial tension on the relative strain of substrate 40 and second layer 77.

Also, the apparent initial tension may be reduced by subjecting a low concentration n-type silicon to epitaxial growth on vibrator 76 to a suitable thickness Furthermore, heat oxidation may be used to generate a compression strain in a hot oxide film, to thereby adjust the apparent initial tension Moreover, the initial tension can be adjusted likewise through CVD, sputtering, evaporation or other like processes.

The impurity atom which is injected has been specified as boron or phosphorus However, the invention is not necessarily limited thereto, and the vibrator beam is also not limited to silicon only. The impurity concentration unit is atoms/cm$^3$, although, in the art the word atoms is usually omitted and such omitted designation is well known.

The invention can be used to measure pressure, such as applied by acceleration and hence may serve as an acceleration meter, also, to measure pressure differential, etc.

As described, an initial tension is provided to the vibrator beam in a simple manner and is easily adjusted, as contrasted with the prior art.

Figure 4:
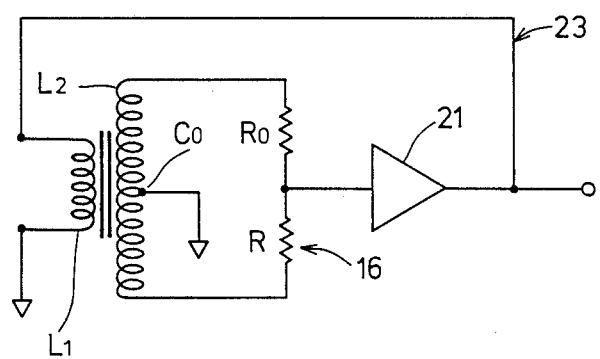
FIG. 4 is a circuit diagram depicting an electrical equivalent circuit of the FIG. 2 device.

Next the amplifier of FIG. 5 will be described with reference to FIG. 21 The problem with the prior art device shown in FIG. 4 is that since the vibrator is constructed in such a manner as to oscillate in a nonlinear domain, the oscillation frequency changes from, limiting an amplitude on, for example, a Zener diode. Also, arrangement used to control the driving voltage is capable of changing the amplitude of the violator according to boundary conditions of a junction with another resonance system or with measuring fluid, and prevents generation of accurate resonance frequency. Such a problem is solved by using the amplifier shown in FIG. 21.

In FIG. 21, there is depicted an amplifier circuit AMC1 with its input ends (+), (−) connected to output ends 37,38 of the vibrator body 24 (see FIG. 5). The output end is inputted further to an amplifier circuit AMC2 through a coupling capacitor C$_5$ and its output voltage is outputted to a junction J for applying to phase adjusting circuit PHC. The output of PHC is then applied to a gain adjusting circuit GAC The amplification output of circuit GAC, after amplification at its first stage, is applied to resistance R$_{10}$, field effect transistor Q$_1$, a series circuit comprising a transformer T, and an output voltage, controlled for magnitude, is generated at output terminal 35 from the secondary side winding of transformer T.

On the other hand, a voltage V$_j$ of junction J is inputted to a half wave rectifier circuit HWR, converted into a DC voltage E$_j$, corresponding to the magnitude of voltage V$_j$, and then inputted to an inversion input end (−) of a comparator CMP. A reference voltage V$_R$ is applied to a non-inversion input end (+) of comparator CMP from an amplitude setting circuit ASC. Comparator CMP amplifies the deviation between DC voltage E$_j$ and reference voltage V$_R$ and applies from the output end thereof the differential voltage to the gate of field effect transistor Q$_1$ to control the resistance between drain and gate, thus controlling the current flowing to the transformer T.

In these circuits, the phase is adjusted by capacitor C$_6$ and a resistance R$_{17}$. The amplitude of voltage generated at the output side 35 is set by resistance R$_{26}$.

In the above embodiment, when a voltage is applied to input transformer 29 from amplifier 39, a current i flows to first vibrator 26A from the output. Thus, first vibrator 26A vibrates on an electromotive force operating with a magnetic field of magnet 17. The vibration operates on first vibrator 26B through second vibrator 27. However, since a magnetic field is impressed on first vibrator 26B from magnet 17, a voltage e is generated on first vibrator 26B and, inputted to amplifier 39 through output transformer 36. Amplifier 39 amplifies the voltage and generates an amplified voltage at output terminal 35. The amplified voltage is applied to input transformer 33 and to first vibrator 26A as a greater voltage.

By repeating the above loop coupling, amplifier 39 and vibrator body 24 make a self-oscillation arrangement. Then, by setting the gain of the loop at 1 or more, the self oscillation becomes lasting.

In this case, the voltage amplitude of the self oscillation is controlled so as to come within a range of constant error to reference voltage V$_R$. That is, when DC voltage E$_j$ corresponding to junction voltage V$_j$ is great compared to reference voltage V$_R$, an internal resistance of field effect transistor Q$_1$ is increased on the output of the comparator CMP according to these deviations, a current flowing to transformer T is minimized, and the voltage generated at the output terminal 35 is minimized. As a result, the voltage applied to vibrator body 24 is minimized, and the voltage inputted to amplifier 39 is also minimized.

On the other hand, when DC voltage $E_j$ corresponding to junction voltage $V_j$ is small compared to the reference voltage $V_R$, the operation is reversed.

Thus, the oscillation amplitude operates to coincide with the reference voltage $V_R$ within the range of constant error. The error is determined by the output voltage/gain of comparator CMP. Accordingly, where the gain of the comparator CMP is large, the error may be disregarded in value, and the amplitude of the vibrator operates to be equal to the reference voltage $V_R$ at all times.

Next, the effect when the circuit configuration of FIG. 21 is employed will be discussed with reference to FIGS. 22 and 23, wherein, FIG. 22 indicates the effect when the circuit of FIG. 21 is used and FIG. 23 indicates the effect when the prior art circuit is used wherein the field effect transistor $Q_1$ of FIG. 21 is removed due to short circuiting and the driving force is kept constant, i.e. the drive from the constant supply voltage. The span is 1 kg/cm$^2$ in either case, and the abscissa indicates pressure, and the ordinate indicates indexed value.

Figure 22:
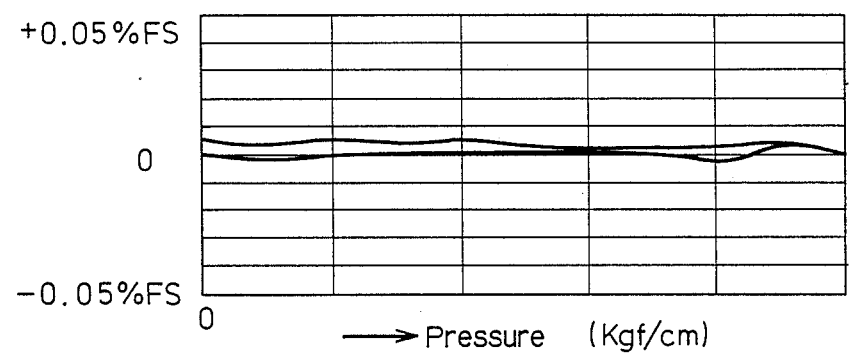
FIG. 22 is a characteristic graph depicting the effects of the amplifier 9 of FIG. 21.
Figure 23:
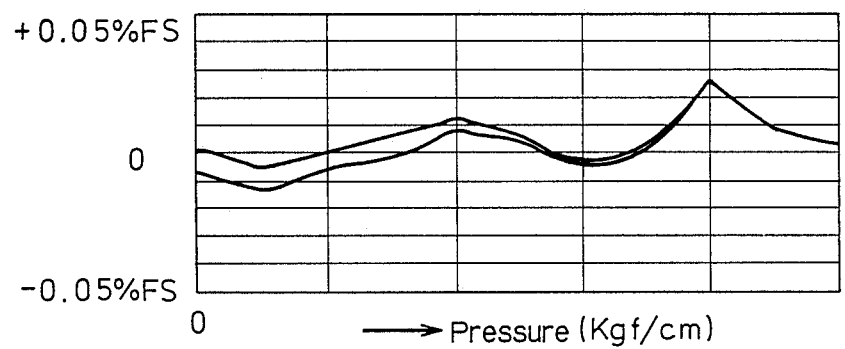
FIG. 23 is a characteristic graph depicting the effect of a circuit when the field effect transistor of FIG. 21 is removed and short-circuited to make the driving force constant.

As will be understood from the results, while the fluctuation is ±0.005% or so in the case of FIG. 22, the fluctuation at ±0.025 maximum or so is indicated in the case of FIG. 23. This indicates an improvement of about five times or so.

As described the invention comprises detecting an amplitude of self oscillation at a point halfway through the amplifier, comparing the detected amplitude with a preset reference voltage, adjusting a gain controlling means provided at the rear stage for the amplitude to coincide with the reference voltage, thereby retaining the amplitude constant, so that the oscillation amplitude is retained constant at all times without being influenced by external conditions and fluctuation will not be brought on the self oscillation frequency. Thus, a high precision vibrating type transducer is obtained by the invention.

The foregoing description is illustrative of the principles of the invention. Numerous extensions and modifications thereof would be apparent to the person skilled in the art. All such extensions and modifications are to be considered to be within the spirit and scope of the invention.

What is claimed is:

1. In a manufacturing process for vibrating type transducer, wherein a beam which functions as a vibrator is formed integrally across a recess formed on a thin diaphragm formed on a silicon substrate through a predetermined first gap with said diaphragm, a top thereof being covered with a shell through a predetermined second gap with said vibrator, the improvement comprising the steps of integrally forming a gap corresponding part consisting of silicon or silicon oxide, which is formed finally into said first gap and second gap, and said beam forming said vibrator with said substrate, covering an upper portion of said gap corresponding part with a part equivalent to said shell integrally with said substrate, forming an injection port for etching reagent which reaches said gap corresponding part on said shell equivalent part, removing said gap corresponding part through etching, and closing said injection port for air tightness.

2. The process of claim 1, wherein said substrate is made of n-type electric conduction type silicon, said gap corresponding part is made of p-type electric conduction type silicon, and said vibrator and said shell are respectively made of p-type electric conduction type silicon having high impurity concentration.

3. The process of claim 1, wherein said recess is formed into an H-shaped recess wherein an H-shaped vibrator body is enclosed through etching said substrate by means of an H-shaped etching mask in the direction of <001> to a crystal plane of said silicon substrate being (100) and also orthogonal thereto.

4. The process of claim 1, wherein forming a protective coat of silicon oxide or nitride on said substrate, partly removing said protective coat through etching to leave a recess, forming said vibrator and said gap corresponding part and shell equivalent part in said recess by epitaxial growth, and removing the remaining portion of said protective coat through etching to form said injection port.

5. The process of claim 2, wherein forming an auxiliary epitaxial layer of 1 μm or less in thickness, and being high in impurity concentration, and of p-type, on said substrate.

6. The process of claim 1, wherein removing said gap corresponding part through etching to form a hollow chamber, sealing said injection port in a gas atmosphere and retained at high temperature, so as to keep said hollow chamber as a high vacuum.

7. The process of claim 6, wherein hydrogen is used for said gas atmosphere.

8. The process of claim 6, wherein oxygen is used for said gas atmosphere.

9. In a manufacturing process for a vibrating type transducer, wherein beam shaped vibrator is formed integrally on a thin diaphragm formed on a silicon single crystal substrate, a top thereof being covered with a shell, the improvement comprising the steps of integrally forming a first part, consisting of silicon or silicon oxide, and said beam shaped vibrator with said substrate;

covering an upper portion of said first part with a second part integrally with said substrate;

forming an injection port for etching reagent which reaches said first part covering said second part;

removing said first part by etching; and closing said injection port for air tightness.

10. The process of claim 9, wherein said substrate is of n-type silicon, said first part is of p-type silicon, and said beam shaped vibrator and said shell are both of p-type silicon and high in impurity concentration.

11. The process of claim 9, wherein an H-shaped vibrator body is formed by etching said substrate by using an H-shaped etching mask in the direction of crystal axis 001 to a crystal face (100) of the crystal silicon substrate and also orthogonal thereto.

12. The process of claim 9, wherein a protective coat is formed, of silicon oxide or nitride, on said substrate; then said protective coat is partly removed by etching, to leave a recess; then said beam shaped vibrator, said first part, and said second part are formed in said recess by epitaxial growth, and then the remaining portion of said protective coating is removed by etching to form said injection port.

13. The process of claim 10, wherein an auxiliary epitaxial layer is formed on said substrate, said layer being of 1 μm or less in thickness, and being high in impurity concentration, and being of p-type semiconductor material.

14. The process of claim 9, wherein said first part is removed by etching to form a hollow chamber, then said injection port is sealed in a gas atmosphere and retained at high temperature, and said hollow chamber is maintained at high vacuum.

15. The process of claim 14, wherein said gas atmosphere is hydrogen.

16. The process of claim 14, wherein said gas atmosphere is oxygen.

* * * * *